(12) United States Patent
Zhang et al.

(10) Patent No.: US 9,735,871 B2
(45) Date of Patent: Aug. 15, 2017

(54) METHOD, APPARATUS, AND COMMUNICATION NODE FOR SUPPRESSING OUTPUT NOISE OF PCIE DEVICES IN OPTICAL FIBER COMMUNICATION

(71) Applicant: HUAWEI TECHNOLOGIES CO., LTD., Shenzhen, Guangdong (CN)

(72) Inventors: Zhong Zhang, Chengdu (CN); Sheng Li, Chengdu (CN); Yu Hu, Chengdu (CN); Xiaoyu Ge, Xi'an (CN); Yongyao Li, Chengdu (CN); Xin Qiu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/957,621

(22) Filed: Dec. 3, 2015

(65) Prior Publication Data

US 2016/0087723 A1 Mar. 24, 2016

Related U.S. Application Data

(63) Continuation of application No. PCT/CN2013/085076, filed on Oct. 12, 2013.

(30) Foreign Application Priority Data

Jun. 3, 2013 (WO) ................ PCT/CN2013/076648

(51) Int. Cl.
*H04B 10/50* (2013.01)
*H04B 10/2507* (2013.01)
(Continued)

(52) U.S. Cl.
CPC ..... *H04B 10/2507* (2013.01); *G06F 13/4282* (2013.01); *H04B 10/0799* (2013.01); *H04B 10/50* (2013.01); *H04B 10/801* (2013.01)

(58) Field of Classification Search
CPC .................................................. H04B 10/516
See application file for complete search history.

(56) References Cited

U.S. PATENT DOCUMENTS

2007/0147836 A1 6/2007 Dong
2009/0052903 A1 2/2009 Mussatt et al.
(Continued)

FOREIGN PATENT DOCUMENTS

CN 1988433 A 6/2007
CN 101977082 A 2/2011
(Continued)

OTHER PUBLICATIONS

"PCI Express Basic Specification Revision 3.0", PCI-SIG, Nov. 2010.*

(Continued)

*Primary Examiner* — Shi K Li
(74) *Attorney, Agent, or Firm* — Huawei Technologies Co., Ltd.

(57) ABSTRACT

A method, an apparatus, and a communication node for suppressing output noises of peripheral component interconnect express (PCIe) devices in optical fiber communication is provided. The communication node includes a PCIe chip and a detection and control circuit connected to a transmitting end of the PCIe chip. The PCIe chip transmits an electrical signal by a transmitter of a first lane. The detection and control circuit detects a differential-mode voltage of the electrical signal. If the differential-mode voltage is lower than a first threshold, the detection and control circuit controls an optical module connected to the PCIe chip not to transmit an optical signal through the first lane of the optical module. When a PCIe system includes the communication node, output noises of the transmitter is suppressed, and a normal optical fiber communication link is ensured.

3 Claims, 12 Drawing Sheets

(51) Int. Cl.
*H04B 10/079* (2013.01)
*H04B 10/80* (2013.01)
*G06F 13/42* (2006.01)

(56) References Cited

U.S. PATENT DOCUMENTS

| | | |
|---|---|---|
| 2009/0263127 A1 | 10/2009 | Haran et al. |
| 2009/0279889 A1 | 11/2009 | Kirkpatrick et al. |
| 2010/0070673 A1 | 3/2010 | Jung et al. |
| 2012/0082463 A1 | 4/2012 | Kasprzyk et al. |
| 2012/0106949 A1 | 5/2012 | Tang |
| 2013/0129346 A1 | 5/2013 | Zbinden et al. |
| 2013/0129359 A1 | 5/2013 | Zbinden et al. |

FOREIGN PATENT DOCUMENTS

| | | |
|---|---|---|
| CN | 102723988 A | 10/2012 |
| CN | 202696626 U | 1/2013 |
| CN | 202889405 U | 4/2013 |
| EP | 2474914 A1 | 7/2012 |
| EP | 2552057 A1 | 1/2013 |
| JP | 2012146041 A | 8/2012 |
| WO | 2012047423 A1 | 4/2012 |

OTHER PUBLICATIONS

XP55325187,Jeff Mandin pmc-sierra:"epon powersaving via sleep mode", Sep. 30, 2008. total 8 pages.

* cited by examiner

US 9,735,871 B2

METHOD, APPARATUS, AND COMMUNICATION NODE FOR SUPPRESSING OUTPUT NOISE OF PCIE DEVICES IN OPTICAL FIBER COMMUNICATION

CROSS-REFERENCE TO RELATED APPLICATIONS

This application is a continuation of International Application No. PCT/CN2013/085076, filed on Oct. 12, 2013, which claims priority to International Patent Application No. PCT/CN2013/076648, filed with the Chinese Patent Office on Jun. 3, 2013, both of which are hereby incorporated by reference in their entireties.

TECHNICAL FIELD

The present application relates to the technical field of optical fiber communication, and in particular, to a method, an apparatus, and a communication node for suppressing output noises of Peripheral Component Interconnect Express (PCIe) devices in optical fiber communication.

BACKGROUND

A PCIe bus is a high-performance system bus applied in computers and communication platforms. In the existing technology, communication status of two communication parties that interact on a PCIe bus is defined. Because two parties communicating with each other, having interface modules acting as a transmitting end and a receiving end respectively, are connected through an electrical cable, a differential-mode voltage of the transmitting end is basically the same as a differential-mode voltage of the receiving end. If the differential-mode voltage of the receiving end is below 65 mV (millivolt), the receiving end determines that the transmitting end is in an electrical idle state. If the differential-mode voltage of the receiving end ranges between 65 mV and 175 mV, the receiving end determines that a noise signal is transmitted by the transmitting end. If the differential-mode voltage of the receiving end is above 175 mV, the receiving end determines that a normal signal is received and it decodes this signal.

In order to improve transmission rate and quality between the two communication parties, in the existing technology, an optical fiber may be adopted to connect the transmitting end with the receiving end. Because the signal output by the transmitting end is an electrical signal, optical modules (implemented by hardware circuits) need to be installed at the transmitting end and the receiving end respectively. The optical module at the transmitting end converts the electrical signal into an optical signal, and after the optical signal is transmitted to the receiving end, the optical module at the receiving end converts the optical signal back into an electrical signal.

However, when the two communication parties communicate through an optical fiber, even if the differential-mode voltage of the transmitting end is below 65 mV, due to light emission characteristics of the optical modules, the differential-mode voltage received at the receiving end may still be above 175 mV. This leads the receiving end to regard the noise output from the transmitting end as a normal signal. Therefore an abnormality in optical fiber communication may occur when the transmitting end is in an electrical idle state or outputs noises.

SUMMARY

Embodiments of the present application provide a method, an apparatus, and a communication node for suppressing output noises of PCIe devices in optical fiber communication. An objective of the application is to resolve a problem in the existing technology that, in a situation in which a transmitting end is in an electrical idle state or outputs noises, a differential-mode voltage of a receiving end may be above 175 my, thereby causing abnormality in optical fiber communication.

To resolve the foregoing technical problem, embodiments of the present application provide the following solutions:

According to a first aspect, an embodiment of the present application provides a signal processing device, hereinafter referred as an optical device. Optical devices are used in a Peripheral Component Interconnect Express (PCIe) system. The PCIe system includes a first PCIe device, a second PCIe device communicating with the first PCIe device, a first optical device connecting the first PICe device with one end of an optical fiber, and a second optical device connecting another end of the optical fiber with the second PICe device. The first optical device is used to receive an electrical signal transmitted from a communication lane of the first PCIe device. The first optical device includes circuitries that form a detection and control module, and an electrical-optical conversion module. The detection and control circuit detects a differential-mode voltage of the electrical signal transmitted from the communication lane of the first PCIe device. If the differential-mode voltage of the electrical signal is lower than a first threshold, the detection and control module transmits a control signal to the electrical-optical conversion module, where the control signal indicates that the communication lane of the first PCIe device is in an electrical idle state or the electrical signal is a noise signal. Then, the electrical-optical conversion module generates an optical signal according to the control signal where optical signal indicates that the communication lane of the first PCIe device is in an electrical idle state or is transmitting a noise signal.

Similarly, the second optical device includes circuitries that form a detection and control circuit. The second optical device further includes circuitries that form an optical-electrical conversion module and an electrical signal driver module. The optical-electrical conversion module receives the optical signal from the communication lane of the first PCIe device through an optical fiber. The detection and control module of the second optical device detects, according to the electrical signal converted from the received optical signal, whether the received optical signal indicates that the communication lane of the first PCIe device is in an electrical idle state. The electrical signal driver module generates a suppressed electrical signal and transmits the suppressed electrical signal to the second PCIe device when it is detected that the communication lane of the first PCIe device is in the electrical idle state, wherein a differential-mode voltage of the suppressed electrical signal is lower than a second threshold.

According to a second aspect, an embodiment of the present application provides a signal processing device, hereinafter referred as an optical device. Optical devices are used in a Peripheral Component Interconnect Express (PCIe) system. The PCIe system includes a first PCIe device, a second PCIe device communicating with the first PCIe device, a first optical device connecting the first PICe device with one end of an optical fiber, and a second optical device connecting another end of the optical fiber with the second PICe device. The first optical device is used to receive an electrical signal transmitted from a communication lane of the first PCIe device. The first optical device includes circuitries that form a detection and control module and an electrical-optical conversion module. The detection and control module detects a differential-mode voltage of the electrical signal. If the differential-mode voltage of the electrical signal is lower than a first threshold, the detection and control module transmits a control signal to the electrical-optical conversion module, where the control signal indicates that the electrical signal is a noise signal or the communication lane of the first PCIe device is in an electrical idle state. The electrical-optical conversion module converts the electrical signal into an optical signal if no control signal is received, or suspends from converting the electrical signal into the optical signal if the control signal is received.

Similarly, the second optical device also includes circuitries that form a detection and control circuit and an electrical-optical conversion module. The second optical device further includes circuitries that form an optical-electrical conversion module and an electrical signal driver module. After receiving an optical signal from a communication lane of the first PCIe device through the optical fiber, the optical signal conversion module of the second optical device detects whether a power of the received optical signal is lower than a power threshold. If the power of the optical signal is not lower than the power threshold, the electrical signal driver module of the second optical device converts the received optical signal into an electrical signal and transmits the electrical signal to the communication lane of the second PCIe device. If the power of the optical signal is lower than the power threshold, the electrical signal driver module generates a suppressed electrical signal and transmits the suppressed electrical signal to the communication lane of the second PCIe device, where a differential-mode voltage of the suppressed electrical signal is lower than a second threshold.

According to a third aspect, an embodiment of the present application provides a communication device which includes a Peripheral Component Interconnect Express (PCIe) chip and a detection and control circuit connected to a transmitting end of the PCIe chip. The transmitting end of the PCIe chip transmits an electrical signal. The detection and control circuit detects a differential-mode voltage of the electrical signal. If the differential-mode voltage of the electrical signal is lower than a threshold, the detection and control circuit instructs an optical device, which is connected to the transmitting end of the PCIe chip and which converts the electrical signal into an optical signal, not to output the optical signal.

According to a fourth aspect, an embodiment of the present application provides a communication system which includes a first Peripheral Component Interconnect Express (PCIe) device, a second PCIe device, a first optical module, and a second optical module. The first PCI device is connected to the first optical module. The first optical module is connected to the second optical module via an optical fiber. The second optical module is connected to the second PCIe device. The first PCIe device transmits a first electrical signal through a first communication lane to the first optical module. The first optical module detects a differential-mode voltage of the first electrical signal. If the differential-mode voltage of the first electrical signal is lower than a first threshold, the first optical module generates a first optical signal and transmits the first optical signal to the second optical module. The first optical signal indicates that the first communication lane of the first PCIe device is in an electrical idle state or is transmitting a noise signal. After the second optical module receives the first optical signal, the second optical module converts the received first optical signal into a second electrical signal. If the second optical module determines, according to the second electrical signal, that the first optical signal is an optical signal indicating that the first communication lane of the first PCIe device is in an electrical idle state or is transmitting a noise signal, the second optical module transmits a suppressed electrical signal to a second communication lane of the second PCIe device connected to the second optical module. A differential-mode voltage of the suppressed electrical signal is lower than a second threshold.

In an application of the embodiments of the present application, when two communication parties communicate by using an optical fiber, and when a differential-mode voltage of a signal transmitted by a transmitting end is lower than a threshold, an optical module is controlled to be disabled, so that the transmitting end cannot output a noise signal. This prevents a receiving end from receiving an abnormal signal and ensures that an optical fiber communication link is normal.

BRIEF DESCRIPTION OF THE DRAWINGS

To describe the technical solutions of the present application more clearly, various accompany drawings are used. The following briefly introduces the accompanying drawings used in detailed description of the embodiments.

DETAILED DESCRIPTION OF EMBODIMENTS

The following embodiments of the present application provide a method, an apparatus, and a communication node for suppressing output noise of PCIe in optical fiber communication.

Figure 1:
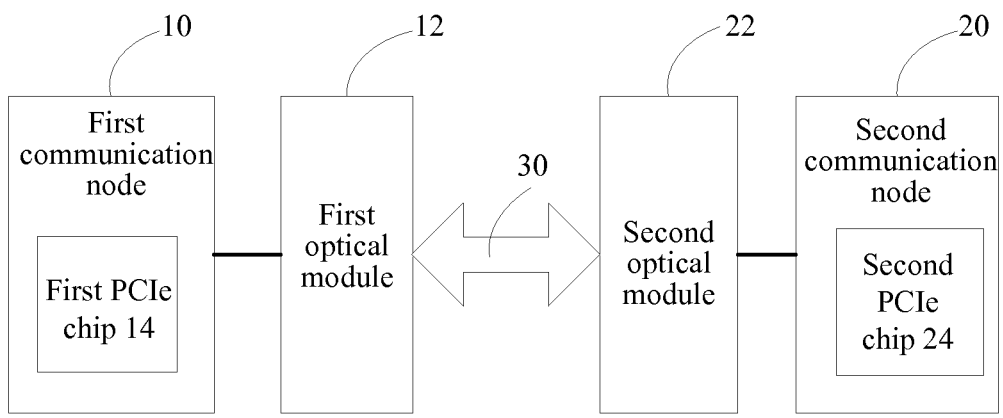
FIG. 1 is a schematic diagram of a communication system according to an embodiment of the present application.

A communication system according to an embodiment of the present application is shown in FIG. 1. This communication system includes a first communication node 10, a second communication node 20, a first optical module 12, and a second optical module 22. The first communication node 10 and the second communication node 20 are both Peripheral Component Interconnect Express (PCIe) devices. The first communication node 10 includes a first PCIe chip 14, and the second communication node 20 includes a second PCIe chip 24. The first communication node 10 and the first optical module 12 are connected using an electrical cable, and the second optical module 22 and the second communication node 20 are connected using an electrical cable. The first optical module 12 and the second optical module 22 are used to convert between an electrical signal and an optical signal. The first optical module 12 and the second optical module 22 are connected using an optical fiber 30.

The following description assumes that the first communication node 10 transmits data to the second communication node 20. Certainly, it can be understood that, the first communication node 10 may also be used as a receiving end, and the second communication node 20 may also be used as a transmitting end. When the first communication node 10 transmits data to the second communication node 20, the first optical module 12, which is connected to the first communication node 10, converts an electrical signal transmitted by the first PCIe chip 14 into an optical signal. The first optical module 12 transmits, by using the optical fiber 30, the optical signal to the second optical module 22, which is connected to the second communication node 20. The second optical module 22 converts the received optical signal into an electrical signal, and then forwards the electrical signal to the second PCIe chip 24 in the second communication node 20, thus realizing the communication between the first communication node 10 and the second communication node 20. Because the first optical module 12 and the second optical module 22 are connected using the optical fiber 30, communication between the first communication node 10 and the second communication node 20 can be achieved even if the distance between the first communication node 10 and the second communication node 20 is long.

The first communication node 10 and the second optical module 12 may be set up independently from each other. For example, the first communication node 10 may be a circuit board, and the first optical module 12 may be connected to the circuit board via a connector. The first communication node 10 and the first optical module 12 may also be integrated into a same communication device. For example, if the first communication node 10 is a communication device having a circuit board, the first optical module 12 may also be placed within the first communication node 10 by connecting with the circuit board. Similarly, the second communication node 20 and the second optical module 22 may be set up separately, or the second communication node 20 and the second optical module 22 may be integrated into a same communication device. The manner of setting up the communication system of FIG. 1 is not limited herein.

In the existing technology, communication status of a link between two communication parties that interact through a PCIe bus is defined. An electrical idle (EI) state of a link is a state in which a difference between a D+ voltage and a D− voltage of two differential lines of a transmitting end of a PCIe chip keep steady and unchanged (i.e. at a common-mode voltage). Generally, a link is in an EI state when the link is switched or the link is in a low power consumption mode. When the link is in an EI state, the transmitting end of the PCIe chip does not transmit data. For example, in the communication system shown in FIG. 1, the first communication node 10 transmits data to the second communication node 20. When a link between the first communication node 10 and the second communication node 20 is in an EI state, a noise signal having a relatively large amplitude is still output by the second optical module 22 although no effective differential electrical signal is output from the transmitting end of the first PCIe chip 14. The noise signal may cause a differential-mode voltage received by the second communication node 20 to be above 175 mV, so that the second communication node 20 incorrectly considers that the first communication node 10 has transmitted data, and this causes inconsistency in link status between the first communication node 10 and the second communication node 20.

It should be noted that, the first communication node 10 and the second communication node 20 shown in FIG. 1 may be examples of PCIe devices, and the PCIe devices may further include PCIe chips or one or more other devices. In the embodiments of the present application, a device that implements communication according to the PCIe standard is called a PCIe device.

Figure 2A:
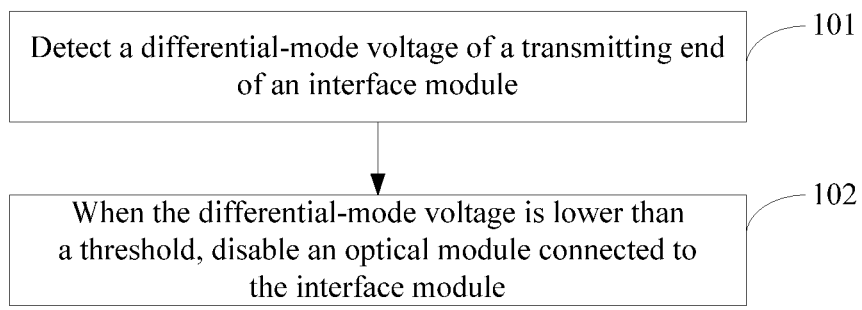
FIG. 2A is a flowchart of a method for suppressing output noises of PCIe devices in optical fiber communication, according to an embodiment of the present application.

FIG. 2A is a flowchart of a method for suppressing output noises of PCIe devices in optical fiber communication according to an embodiment of the present application.

Step 101: Detect a differential-mode voltage of a transmitting end of an interface module.

In this embodiment, a process of controlling optical fiber communication is described from a side of a communication node at a transmitting end. The interface module of the communication node at the transmitting end may specifically be a PCIe interface chip, a pair of differential lines is disposed at the transmitting end of the interface module. By detecting a voltage difference between the pair of differential lines at the transmitting end, a differential-mode voltage of an electrical signal transmitted by the transmitting end can be obtained. After the electrical signal is output to an optical module of the transmitting end, which is connected to the interface module, the optical module of the transmitting end converts the electrical signal into an optical signal. After the optical signal is transmitted to an optical module of a receiving end by using an optical fiber, the optical module of the receiving end converts the optical signal back into an electrical signal, which is then received by a receiving module of a communication node at the receiving end.

Step 102: When the differential-mode voltage is lower than a threshold, disable the optical module connected to the interface module.

In this embodiment, when the optical module connected to the interface module is to be disabled, a TX_DISABLE function of a control end of the optical module may be activated to disable a laser of the optical module. Alternatively, a disable command may be transmitted to an Inter-Integrated Circuit (I2C) interface of the optical module to disable the laser of the optical module. Further, a detection result that the differential-mode voltage is lower than the threshold may be transmitted to a central processing unit (CPU) in an interrupt mode, so that the CPU controls the laser of the optical module to be disabled. After the laser of the optical module of the transmitting end is disabled, the optical module of the transmitting end no longer transmits an optical signal, and therefore, the receiving end receives no optical signal.

According to a definition in the PCIe standard, when the interface module is specifically a PCIe interface chip, if the differential-mode voltage of the electrical signal received by the communication node at the receiving end is below 65 mV (millivolt), the communication node at the receiving end determines that the communication node at the transmitting end is in an electrical idle state. If the differential-mode voltage of the electrical signal received by the communication node at the receiving end ranges between 65 mV and 175 mV, the communication node at the receiving end determines that the communication node at the transmitting end transmits a noise signal. If the differential-mode voltage of the electrical signal received by the communication node at the receiving end is above 175 mV, the communication node at the receiving end determines that the communication node at the transmitting end transmits a normal signal. Therefore, in an application of the embodiment of the present application, if the differential-mode voltage of the electrical signal transmitted by the communication node at the transmitting end is below 175 mV, that is, the transmitting end is in an electrical idle state, or if the optical module of the transmitting end is still on when a noise signal is transmitted, the communication node at the receiving end may receive an electrical signal whose differential-mode voltage is above 175 mV due to light emission characteristics of the optical module, thereby making a detection result inaccurate. Accordingly, in this embodiment of the present application, the threshold may be set to 175 mV. Then, when it is detected that the differential-mode voltage of the transmitting end of the PCIe interface chip of the communication node at the transmitting end is below 175 my, the optical module of the transmitting end is disabled to ensure that an optical fiber communication link is normal.

As can be seen from the foregoing embodiment, when two communication parties communicate by using an optical fiber, and when it is detected that a differential-mode voltage of a signal transmitted by a transmitting end is lower than a threshold, an optical module may be controlled to be disabled, so that the transmitting end cannot output a noise signal. This prevents a receiving end from receiving an abnormal signal and ensures that an optical fiber communication link is normal.

Figure 2B:
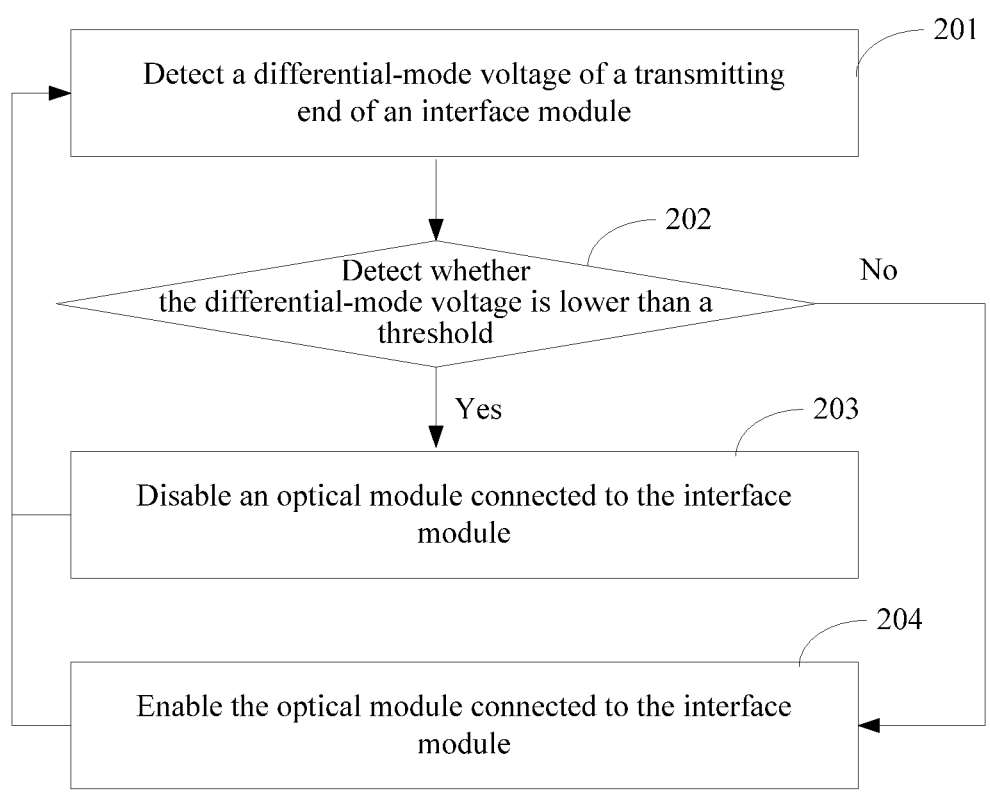
FIG. 2B is a flowchart of a method for suppressing output noises of PCIe devices in optical fiber communication, according to another embodiment of the present application.

FIG. 2B is a flowchart of the method for suppressing output noises of PCIe devices in optical fiber communication according to another embodiment of the present application.

Step 201: Detect a differential-mode voltage of a transmitting end of an interface module.

In this embodiment, a process of controlling optical fiber communication is described from a side of a communication node at a transmitting end. The interface module of the communication node at the transmitting end may specifically be a PCIe interface chip, a pair of differential lines is disposed at the transmitting end of the interface module, and by detecting a voltage difference between the pair of differential lines at the transmitting end, a differential-mode voltage of an electrical signal transmitted by the transmitting end can be obtained. After the electrical signal is output to an optical module of the transmitting end, which is connected to the interface module, the optical module of the transmitting end converts the electrical signal into an optical signal. After the optical signal is transmitted to an optical module of a receiving end by using an optical fiber, the optical module of the receiving end converts the optical signal back into an electrical signal, which is then received by a receiving module of a communication node at the receiving end.

Step 202: Detect whether the differential-mode voltage is lower than a threshold. If the differential-mode voltage is lower than the threshold, perform step 203; and if the differential-mode voltage is not lower than the threshold, perform step 204.

In this embodiment, when the interface module is specifically a PCIe interface chip, according to a definition in the PCIe standard, if the differential-mode voltage of the electrical signal received by the communication node at the receiving end is below 65 mV, the communication node at the receiving end determines that the communication node at the transmitting end is in an electrical idle state. If the differential-mode voltage of the electrical signal received by the communication node at the receiving end ranges between 65 mV and 175 mV, the communication node at the receiving end determines that the communication node at the transmitting end transmits a noise signal. If the differential-mode voltage of the electrical signal received by the communication node at the receiving end is above 175 mV, the communication node at the receiving end determines that the communication node at the transmitting end transmits a normal signal. Therefore, in an application of the embodiment of the present application, if the differential-mode voltage of the electrical signal transmitted by the communication node at the transmitting end is below 175 mV, that is, the transmitting end is in an electrical idle state, or if the optical module of the transmitting end is still on when a noise signal is transmitted, the communication node at the receiving end may receive an electrical signal whose differential-mode voltage is above 175 mV due to light emission characteristics of the optical module, thereby making a detection result inaccurate. Accordingly, in this embodiment of the present application, the threshold may be set to 175 mV. Then, when it is detected that the differential-mode voltage of the transmitting end of the PCIe interface chip of the communication node at the transmitting end is below 175 my, the optical module of the transmitting end is controlled to be disabled to ensure that an optical fiber communication link is normal. It should be noted that, setting the foregoing threshold to be 175 mV is merely an example, and in an actual application, the threshold may be adjusted as required, and the embodiment of the present application has no limitation on this.

Step 203: Control the optical module connected to the interface module to be disabled, and return to step 201.

In this embodiment, when the optical module connected to the interface module is controlled to be disabled, a TX_DISABLE function of a control end of the optical module may be activated to disable a laser of the optical module, or a disable command may be transmitted to an I2C interface of the optical module to disable the laser of the optical module, or a detection result that the differential-mode voltage is lower than the threshold may be transmitted to a CPU in an interrupt mode, so that the CPU controls the laser of the optical module to be disabled. After the laser of the optical module of the transmitting end is disabled, the optical module of the transmitting end no longer transmits an optical signal, and therefore, the receiving end receives no optical signal.

Step 204: Enable the optical module connected to the interface module, and return to step 201.

In this embodiment, when the optical module connected to the interface module is enabled, a TX_DISABLE function of the control end of the optical module may be deactivated to control the laser of the optical module to be enabled, or an enable command may be transmitted to the I2C interface of the optical module to enable the laser of the optical module, or a detection result that the differential-mode voltage is higher than the threshold may be transmitted to the CPU in an interrupt mode, so that the CPU controls the laser of the optical module to be enabled. When the laser of the optical module of the transmitting end is enabled, the optical module of the transmitting end transmits an optical signal to perform normal optical fiber communication with the optical module of the receiving end.

As can be seen from the foregoing embodiment, when two communication parties communicate by using an optical fiber, and when it is detected that a differential-mode voltage of a signal transmitted by a transmitting end is lower than a threshold, an optical module may be controlled to be disabled, so that the transmitting end cannot output a noise signal. This prevents a receiving end from receiving an abnormal signal and ensures that an optical fiber communication link is normal.

The following describes the embodiments of the present application in detail with reference to several optical communication architectures. Each of the optical communication architectures described below includes two communication nodes, each communication node includes a PCIe interface chip and a detection and control circuit, and the PCIe interface chip of each communication node includes a transmitting end and a receiving end, that is, the two communication nodes have equivalent communication functions. For ease of description, referring to FIG. 3, it is assumed that the communication node on the left is a communication node at a transmitting end, and the communication node on the right is a communication node at a receiving end. An optical module connected to the communication node at the transmitting end and an optical module connected to the communication node at the receiving end are connected to each other by using an optical fiber, so as to implement optical communications between the two communication nodes. The detection and control circuit may be implemented based on a field programmable gate array (FPGA).

Figure 3:
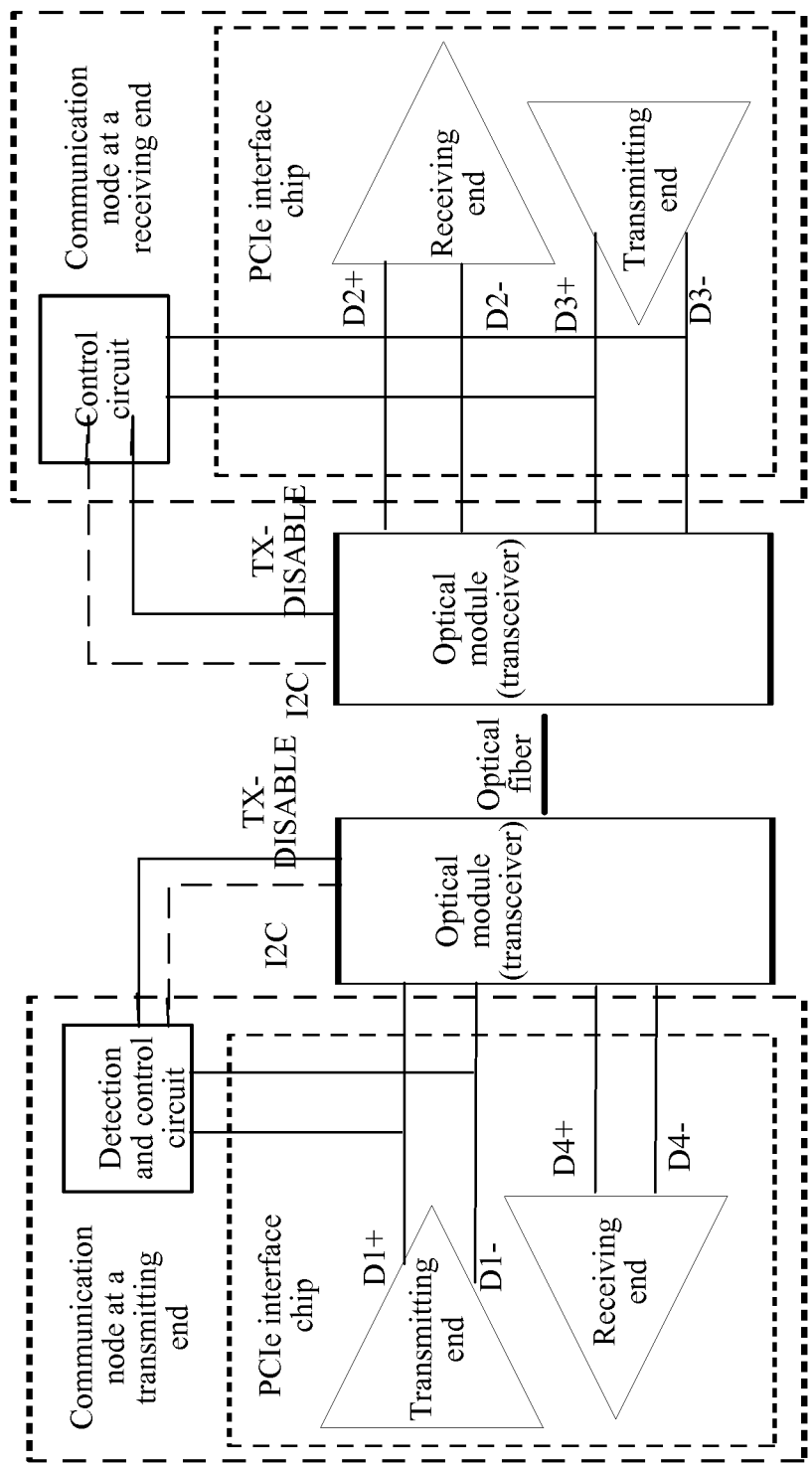
FIG. 3 is a schematic diagram of an optical communication architecture according to an embodiment of the present application.

FIG. 3 is a schematic diagram of an optical communication architecture according to an embodiment of the present application.

In FIG. 3, the PCIe interface chip and the detection and control circuit of the communication node at the transmitting end are disposed separately. A pair of differential lines denoted by D1+ and D1− respectively is disposed at the transmitting end of the PCIe interface chip to correspond to a pair of differential lines D2+ and D2− disposed on the PCIe interface chip of the communication node at the receiving end. The detection and control circuit of the communication node at the transmitting end is connected to the pair of differential lines D1+ and D1− to facilitate detection of a differential-mode voltage between D1+ and D1−. In addition, the detection and control circuit is further connected to the optical module, where, according to a control type, one control line is connected to a TX_DISABLE function of a control end of the optical module and the other control line may be connected to the I2C interface of the optical module.

During the control of the optical fiber communication, the detection and control circuit of the communication node at the transmitting end detects a voltage difference between D1+ and D1− to obtain a differential-mode voltage. When the detected differential-mode voltage is lower than 175 mV, a laser of the optical module may be controlled, by enabling a TX_DISABLE function, to be disabled, or the laser of the optical module may also be controlled, by transmitting a disable command to the I2C interface, to be disabled. After the laser of the optical module of the transmitting end on a side of the communication node at the transmitting end is disabled, the communication between the optical module of the transmitting end on the side of the communication node at the transmitting end and the optical module of the receiving end on a side of the communication node at the receiving end is interrupted, thereby ensuring accuracy of a detection result of the differential-mode voltage of the communication node at the receiving end. When the detected differential-mode voltage is higher than 175 mV, it means that the communication node at the transmitting end is to transmit a normal signal. Therefore, the laser of the optical module may be controlled, by disabling a TX_DISABLE function, to be enabled, or the laser of the optical module may also be controlled, by transmitting an enable command to the I2C interface, to be enabled. After the laser of the optical module of the transmitting end on the side of the communication node at the transmitting end is enabled, the communication between the optical module of the transmitting end on the side of the communication node at the transmitting end and the optical module of the receiving end on the side of the communication node at the receiving end is restored.

Figure 4:
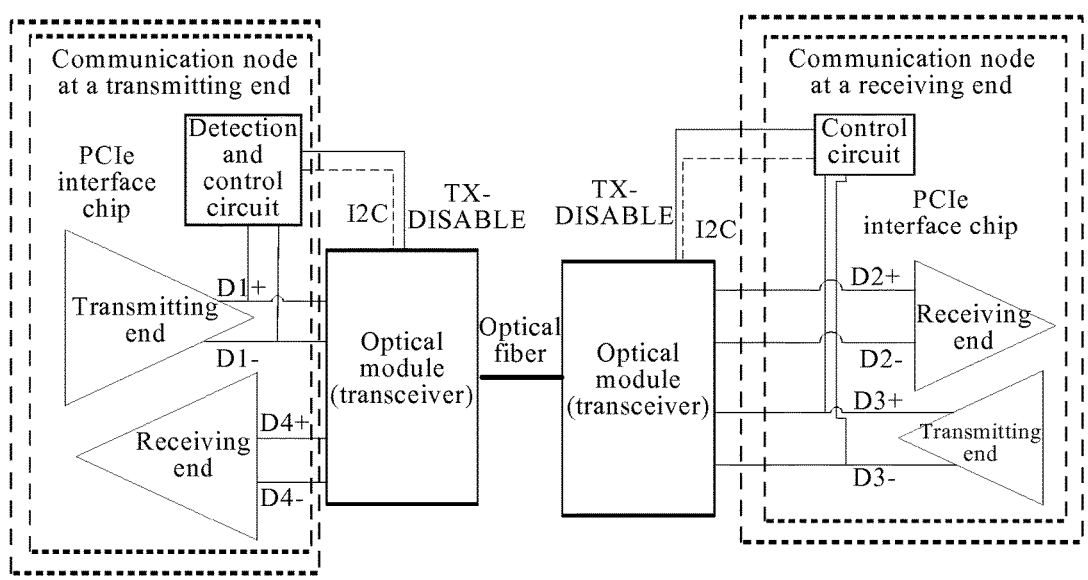
FIG. 4 is a schematic diagram of an optical communication architecture according to another embodiment of the present application.

FIG. 4 is a schematic diagram of another optical communication architecture according to an embodiment of the present application.

FIG. 4 differs from FIG. 3 in that, the detection and control circuit is integrated into the PCIe interface chip, which is equivalent to that the PCIe interface chip directly controls the optical module. A process of how the detection and control circuit controls the optical fiber communication in FIG. 4 is the same as that described in FIG. 3, which is not described herein again.

Figure 5:
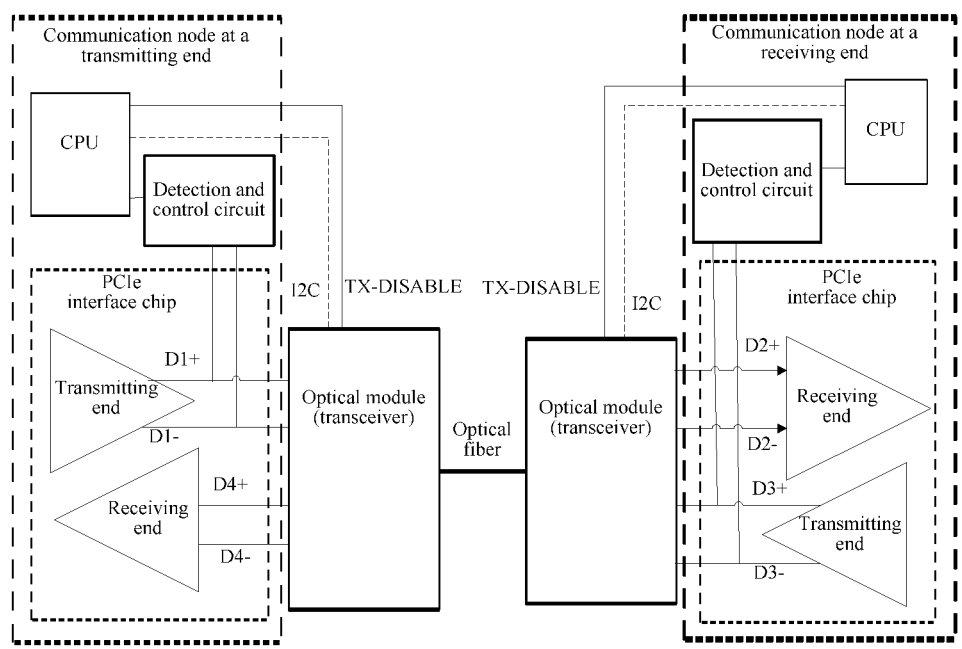
FIG. 5 is a schematic diagram of an optical communication architecture according to yet another embodiment of the present application.

FIG. 5 is a schematic diagram of another optical communication architecture according to an embodiment of the present application.

FIG. 5 is similar to FIG. 3 and FIG. 4 in that, the detection and control circuit of the communication node at the transmitting end is still connected to the pair of differential lines D1+ and D1− of the transmitting end of the PCIe interface chip to facilitate detection of a differential-mode voltage between D1+ and D1−. However, FIG. 5 differs from FIG. 3 and FIG. 4 in that, the detection and control circuit is not directly connected to the optical module but is connected to the CPU, so that the CPU may control the optical module to be enabled or disabled.

During the control of the optical fiber communication, the detection and control circuit of the communication node at the transmitting end detects a voltage difference between D1+ and D1− to obtain a differential-mode voltage. When the detected differential-mode voltage is lower than 175 mV, a detection result may be transmitted to the CPU in an interrupt mode. The CPU may, by activating a TX_DISABLE function, disable a laser of the optical module. Or, the CPU may, by transmitting a disable command to the I2C interface, disable the laser of the optical module. After the laser of the optical module of the transmitting end on a side of the communication node at the transmitting end is disabled, the communication between the optical module of the transmitting end on the side of the communication node at the transmitting end and the optical module of the receiving end on a side of the communication node at the receiving end is interrupted, thereby ensuring accuracy of a detection result of the differential-mode voltage of the communication node at the receiving end. When the detected differential-mode voltage is higher than 175 mV, it means that the communication node at the transmitting end is to transmit a normal signal, and therefore, the detection and control circuit of the communication node at the transmitting end may transmit a detection result to the CPU in an interrupt mode, so that the CPU may disable, by activating a TX_DISABLE function, the laser of the optical module, or may also enable, by transmitting an enable command to the I2C interface, the laser of the optical module. After the laser of the optical module of the transmitting end on the side of the communication node at the transmitting end is enabled, the communication between the optical module of the transmitting end on the side of the communication node at the transmitting end and the optical module of the receiving end on the side of the communication node at the receiving end is restored.

It should be noted that, in the communication architecture shown in FIG. 5, the detection and control circuit and the PCIe interface chip are disposed separately; however, in an actual application, the detection and control circuit may also be integrated into the PCIe interface chip, and the present application has no limitation on this.

Corresponding to the embodiments of the methods for suppressing output noise of PCIe devices in optical fiber communication, embodiments of an apparatus and a communication node are also provided in the present application.

Figure 6:
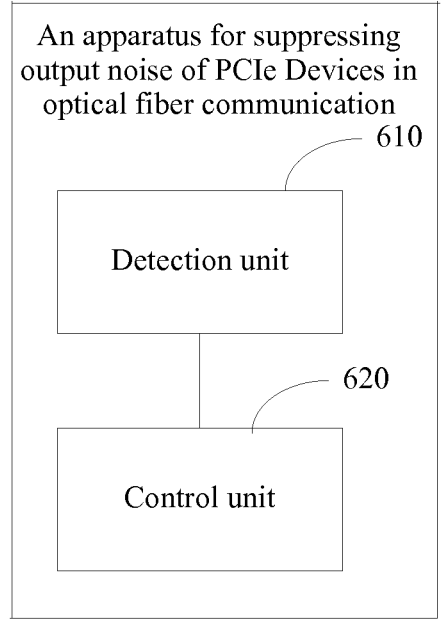
FIG. 6 is a simplified block diagram of an apparatus for suppressing output noises of PCIe devices in optical fiber communication, according to an embodiment of the present application.

FIG. 6 is an apparatus for suppressing output noise of PCIe devices in optical fiber communication according to an embodiment of the present application.

The apparatus includes: a detection unit 610 and a control unit 620. The detection unit 610 is configured to detect a differential-mode voltage of a transmitting end of an interface module. The control unit 620 is configured to: when the differential-mode voltage detected by the detection unit 610 is lower than a threshold, disable an optical module connected to the interface module.

Optionally, the control unit 620 may include at least one of the following units (not shown in FIG. 6):

a first control sub-unit, configured to disable, by activating a TX_DISABLE function of a control end of the optical module, a laser of the optical module; and a second control sub-unit, configured to disable, by transmitting a disable command to an I2C interface of the optical module, the laser of the optical module.

Optionally, the control unit 620 may be specifically configured to transmit a detection result that the differential-mode voltage is lower than the threshold to a central processing unit CPU in an interrupt mode, so that the CPU disables the laser of the optical module.

Optionally, the control unit 620 may be further configured to: when the differential-mode voltage detected by the detection unit 610 is higher than the threshold, enable the optical module connected to the interface module.

Figure 7:
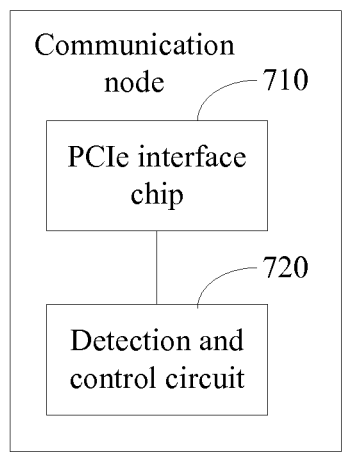
FIG. 7 is a simplified block diagram of a communication node according to an embodiment of the present application.

FIG. 7 is a block diagram of a communication node according to an embodiment of the present application.

The communication node includes: a PCIe interface chip 710 and a detection and control circuit 720 connected to a transmitting end of the PCIe interface chip 710. The detection and control circuit 720 is configured to detect a differential-mode voltage of the transmitting end of the PCIe interface chip 710, and, when the differential-mode voltage is lower than a threshold, disable an optical module connected to the PCIe interface chip 710.

Optionally, the detection and control circuit 720 may be specifically configured to disable, by activating a TX_DISABLE function of a control end of the optical module, a laser of the optical module, or disable, by transmitting a disable command to an I2C interface of the optical module, the laser of the optical module.

Optionally, the communication node may further include a CPU (not shown in FIG. 7); the detection and control circuit 720 may be specifically configured to transmit a detection result that the differential-mode voltage is lower than the threshold to the CPU in an interrupt mode; and the CPU is configured to disable a laser of the optical module.

Optionally, the detection and control circuit 720 may be further configured to: when the differential-mode voltage is higher than the threshold, enable the optical module connected to the PCIe interface chip 710.

Optionally, the detection and control circuit 720 may be integrated into the PCIe interface chip 710.

As can be seen from the foregoing embodiments, a differential-mode voltage of a transmitting end of an interface module is detected, and if the differential voltage is lower than a threshold, an optical module connected to the interface module is disabled. When two communication parties communicate by using an optical fiber according to the embodiments of the present application, and when a differential-mode voltage of a signal transmitted by the transmitting end is lower than the threshold, the optical module may be disabled, so that the transmitting end cannot output a noise signal. This prevents a receiving end from receiving an abnormal signal, and ensures that an optical fiber communication link is working properly.

It can be understood that, in the foregoing embodiments, in a situation in which the PCIe interface chip can support signal transmission of multiple lanes simultaneously (a lane is composed of two differential signaling pairs, with one pair for receiving data and the other for transmitting data), because communication status of the multiple lanes is independent from each other, the detection and control circuit can disable only one lane of the optical module when disabling the optical module connected to the PCIe interface chip, so that the one lane that is disabled does not transmit an optical signal. For example, when a light emission part in the optical module is a laser array, the detection and control circuit can enable a laser of one lane of the optical module not to emit an optical signal, without affecting status of the other lanes. It should be noted that, the PCIe interface chip in this embodiment of the present application may also be called a PCIe chip.

Figure 8:
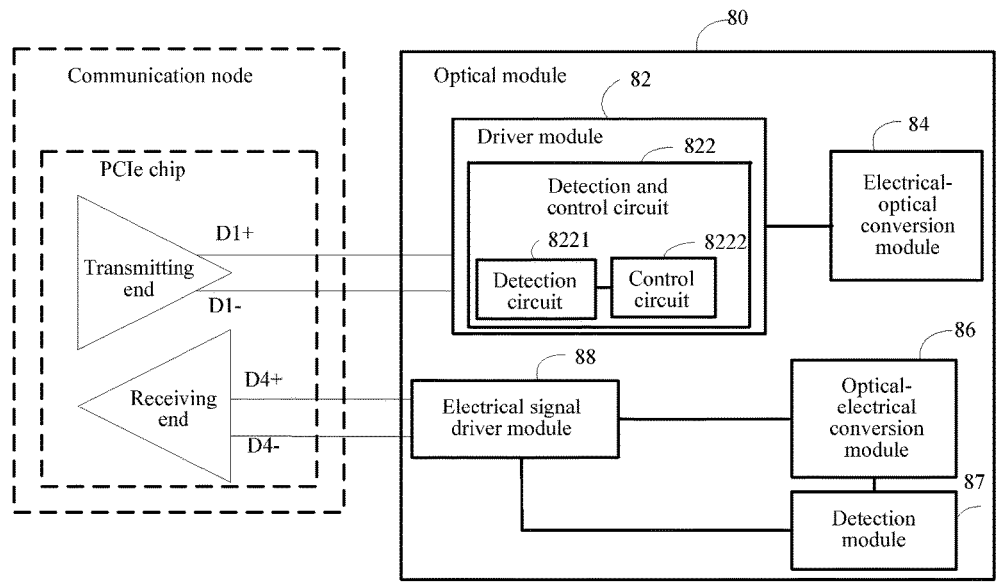
FIG. 8 is a simplified structural diagram of an optical module according to an embodiment of the present application.

FIG. 8 is a schematic structural diagram of an optical module according to an embodiment of the present application. It can be understood that, the optical module 80 shown in FIG. 8 may be the first optical module 12 or may also be the second optical module 22 shown in FIG. 1. The following describes the optical module 80 shown in FIG. 8 with reference to FIG. 1. As shown in FIG. 8, the optical module 80 may include: a driver module 82, an electrical-optical conversion module 84, an optical-electrical conversion module 86, a detection module 87, and an electrical signal driver module 88.

The driver module 82 is connected to a transmitting end of a PCIe chip, and is generally configured to implement functions such as balancing and amplifying an electrical signal transmitted by the transmitting end of the PCIe chip and generating a drive signal according to the electrical signal transmitted by the PCIe chip. In an actual application, the driver module 82 may specifically be a laser driver chip. In the embodiment of the present application, a detection and control circuit 822 is integrated into the driver module 82. The detection and control circuit 822 may include a detection circuit 8221 and a control circuit 8222, where:

the detection circuit 8221 is configured to detect whether a differential-mode voltage of a differential electrical signal transmitted by the PCIe chip is lower than a preset threshold; and the control circuit 8222 is configured to generate a control signal according to a detection result of the detection circuit 8221 to implement control over an optical signal transmitted by the electrical-optical conversion module 84. In an actual application, the control circuit 8222 may be a laser control circuit, and the control signal generated by the control circuit 8222 may be a laser drive signal. It can be understood that, the laser drive signal generated by the control circuit 8222 is specifically an electrical signal, and specifically, the laser drive signal may be a voltage signal and may also be a current signal.

A receiving end of the electrical-optical conversion module 84 is connected to an output end of the driver module 82, and a transmitting end of the electrical-optical conversion module 84 is connected to an optical module at the receiving end by using an optical fiber; and specifically, the transmitting end of the electrical-optical conversion module 84 may be connected to the optical-electrical conversion module of the optical module at the receiving end (for example, the second optical module 22 in FIG. 1) by using an optical fiber. The electrical-optical conversion module 84 is configured to transmit an optical signal according to a control signal generated by the control circuit 8222 in the driver module 82. To state in another way, the electrical-optical conversion module 84 is configured to convert the control signal generated by the driver module 82 into an optical signal and transmit the converted optical signal by using an optical fiber. In an actual application, the electrical-optical conversion module 84 may be a laser, a laser array, or a light-emitting diode (LED). For example, the electrical-optical conversion module 84 may be a vertical cavity surface emitting laser (VCSEL). The electrical-optical conversion module 84 is capable of transmitting a modulated optical signal at a corresponding rate according to the drive signal transmitted by the driver module 82, and an optical power automatic control circuit, which is capable of keeping power of an output optical signal stable, is equipped inside the electrical-optical conversion module 84.

When the optical module 80 is used as the optical module at the receiving end (for example, the second optical module 22 in FIG. 1), the optical-electrical conversion module 86 is configured to receive an optical signal transmitted by an optical module at a transmitting end (for example, the first optical module 12 in FIG. 1) and convert the received optical signal into an electrical signal. In an actual application, the optical-electrical conversion module 86 may be a photodiode or a photodiode array. It can be understood that, the electrical signal obtained after conversion by the optical-electrical conversion module 86 may be a current signal.

The detection module 87 has one end connected to the optical-electrical conversion module 86 and the other end connected to an input end of the electrical signal driver module 88. The detection module 87 is configured to detect an optical power of the optical signal received by the optical-electrical conversion module 86 or configured to detect a waveform of the electrical signal obtained from conversion by the optical signal received by the optical-electrical conversion module 86. In an actual application, a light splitting technology may be adopted, so that a part of the optical signal that is split from the optical signal received by the optical-electrical conversion module 86 is detected in the detection module 87 to implement detection of the optical power of the received optical signal or implement detection of the waveform of the electrical signal obtained from conversion by the optical signal. The detection module 87 may transmit its detection result to the electrical signal driver module 88. The electrical signal driver module 88 may control, according to the detection result of the detection module 87, the differential-mode voltage of the differential electrical signal output by the electrical signal driver module 88 to the input end of the PCIe chip. It can be understood that, the detection module 87 may exist independently or may also be integrated into the electrical signal driver module 88, which is not limited herein.

The input end of the electrical signal driver module 88 is connected to an output end of the optical-electrical conversion module 86 and an output end of the detection module 87 respectively, and the output end of the electrical signal driver module 88 is connected to the receiving end of the PCIe chip. The electrical signal driver module 88 is configured to process, according to the detection result of the detection module 87, the electrical signal obtained from conversion by the optical-electrical conversion module 86, to output a differential electrical signal meeting a requirement to the receiving end of the PCIe chip. For example, the electrical signal driver module 88 may control whether to transmit the electrical signal obtained from conversion by the optical-electrical conversion module 86 to the PCIe chip. Alternatively, the electrical signal driver module 88 may process the electrical signal transmitted to the PCIe chip, to output a differential electrical signal meeting the requirement to the receiving end of the PCIe chip. The processing made by the electrical signal driver module 88 on the electrical signal includes at least one processing manner among converting, amplifying, amplitude limiting, pre-weighting, or the like on the electrical signal. In an actual application, the electrical signal driver module 88 may include a trans-impedance amplifier (TIA).

In an actual application, the optical module 80 may further include a micro control module, where the micro control module may interact with the driver module 82, the electrical-optical conversion module 84, the optical-electrical conversion module 86, the detection module 87, and the electrical signal driver module 88 by using a management lane and a monitoring lane. Moreover, the micro control module may also implement information interaction with a PCIe device including a PCIe chip by using an Inter-Integrated Circuit (I2C) interface, so that the PCIe device implements management and monitoring of the optical module 80. It can be understood that, the I2C interface is merely an example of an out-of-band management interface of the optical module 80.

Figure 9:
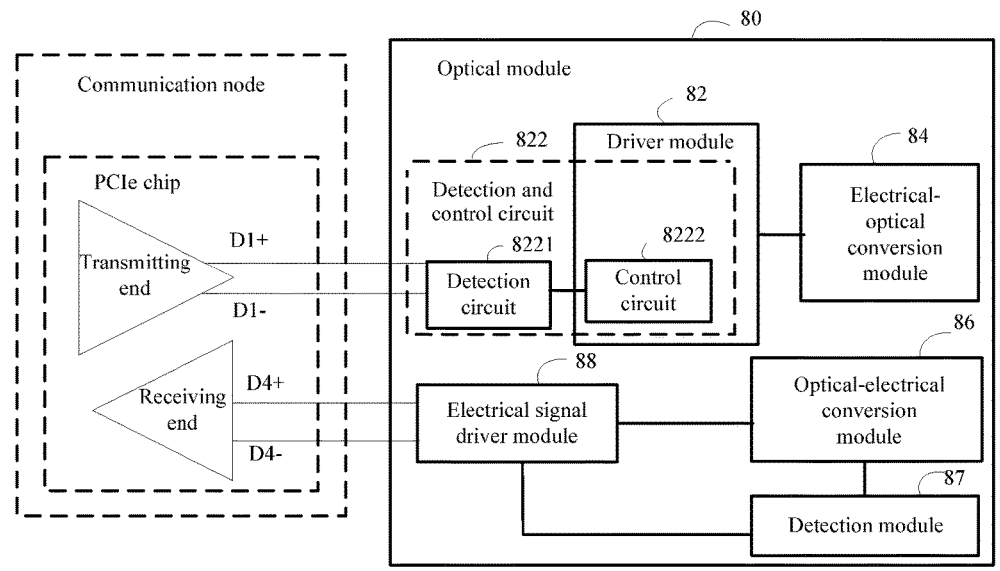
FIG. 9 is a simplified structural diagram of an optical module according to another embodiment of the present application.

FIG. 9 is a schematic structural diagram of another optical module according to an embodiment of the present application. The optical module shown in FIG. 9 differs from the optical module shown in FIG. 8 in that, in the optical module shown in FIG. 9, the detection circuit 8221 is located outside the driver module 82 and exists independently as a peripheral circuit of the driver module 82.

Figure 10:
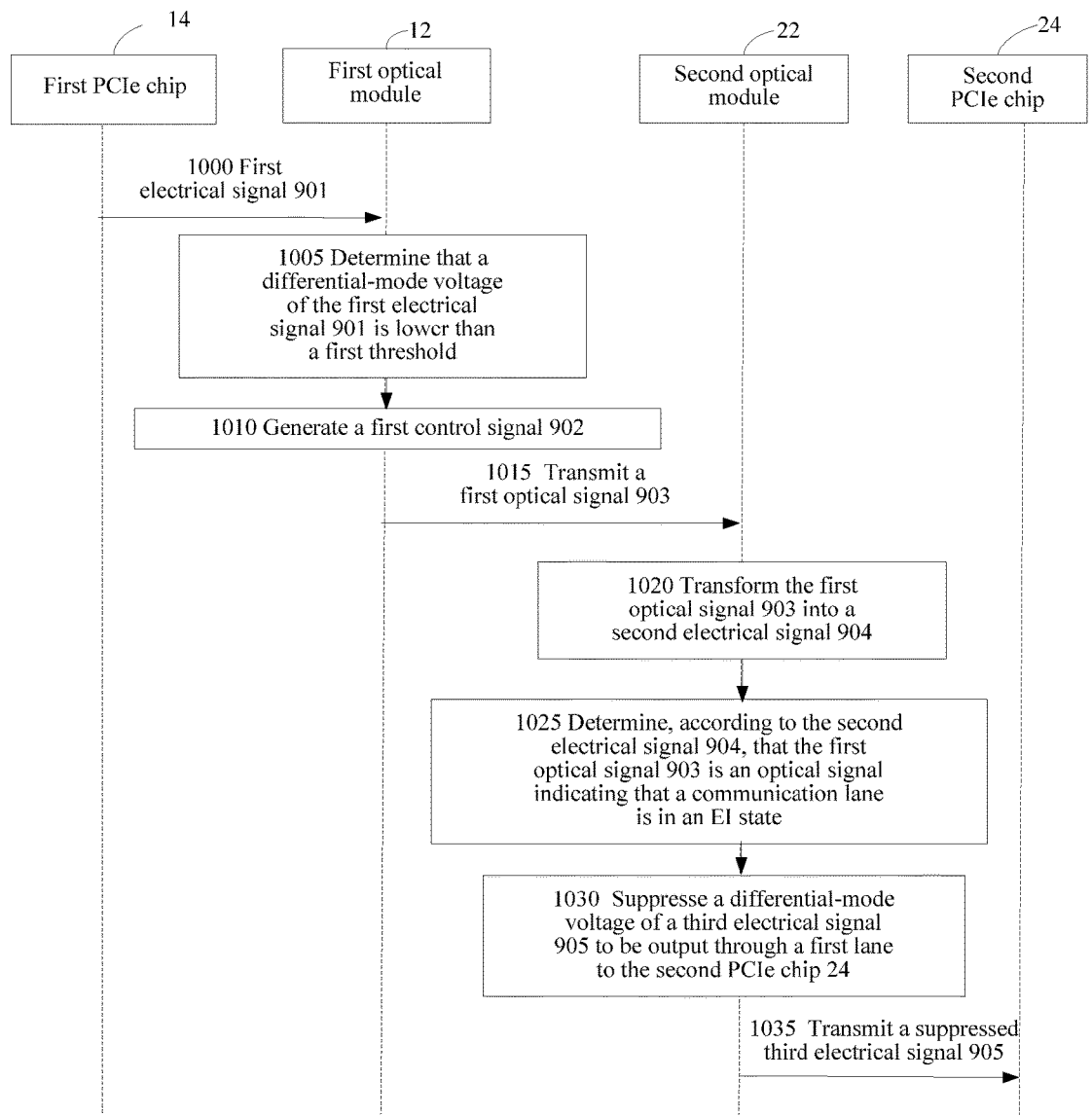
FIG. 10 is a signaling diagram of a communication method according to an embodiment of the present application.
Figure 11A:
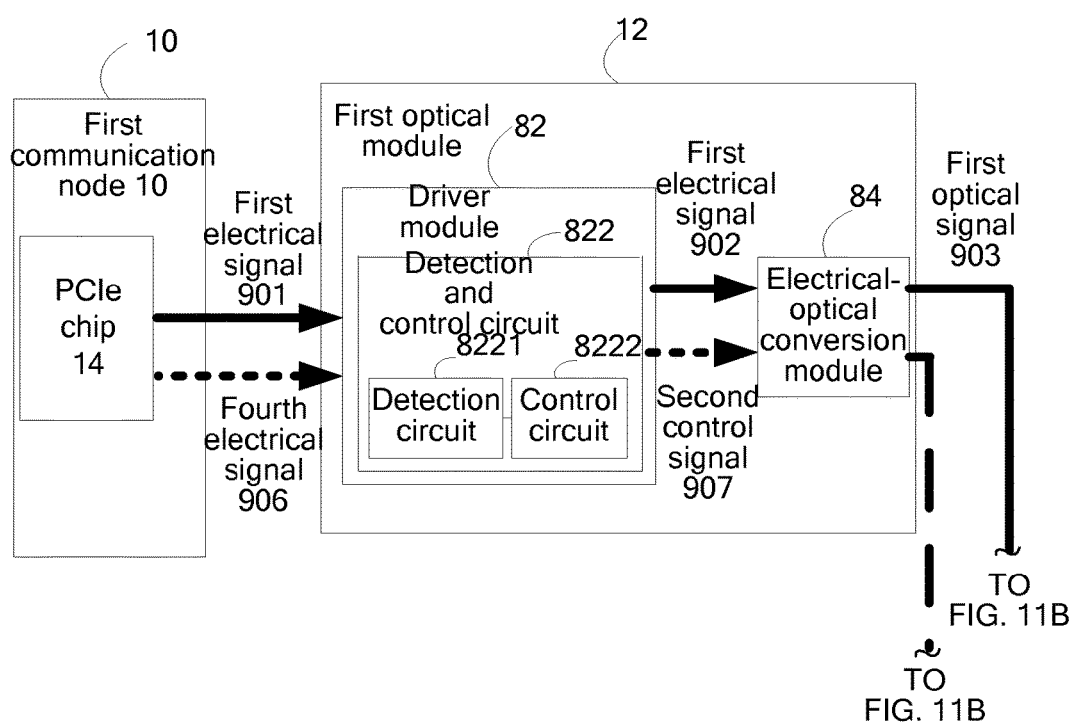
FIG. 11A and FIG. 11B are a signaling diagram of a communication method according to another embodiment of the present application.
Figure 11B:
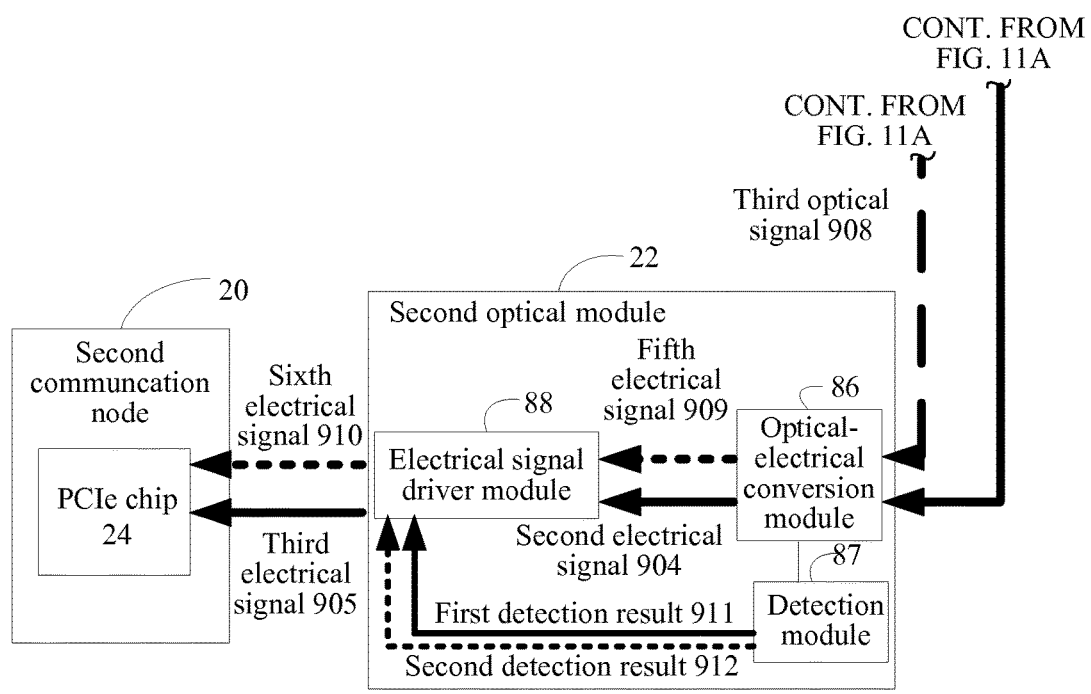

FIG. 10 is a signaling diagram of a communication method according to an embodiment of the present application, and this method is applied to a communication system in which an optical signal is transmitted according to the PCIe standard. This method is capable of suppressing, when a communication lane is in an EI state, noise output on the lane by an optical module, to keep communication status at both ends of a link consistent. This method may be implemented by the optical module shown in FIG. 1, FIG. 8, or FIG. 9. To clearly show a signal transmission process, a case in which the first communication node 10 shown in FIG. 1 is a transmitting end and the second communication node 20 shown in FIG. 1 is a receiving end is used as an example in FIG. 11A and FIG. 11B for description. FIG. 11A and FIG. 11B illustrate, when a communication lane is in an EI state, modules involved in signal processing when the first optical module 12 functions as an optical module at the transmitting end, and modules involved in signal processing when the second optical module 22 functions as an optical module at the receiving end. Certainly, it can be understood that, either the first optical module 12 or the second optical module 22 may function as an optical module at the transmitting end to process a signal transmitted by a PCIe device and may also function as an optical module at the receiving end to process a signal received by the PCIe device. The following describes the communication method shown in FIG. 10 with reference to FIG. 1, FIG. 11A and FIG. 11B. As shown in FIG. 10, the method may include:

In step 1000, the first optical module 12 receives a first electrical signal 901 transmitted by a first PCIe chip 14 through a first lane. In an actual application, a transmitting end of the PCIe chip may transmit multiple lanes of data signals separately to the PCIe chip at the receiving end through multiple lanes simultaneously to improve data transmission efficiency. For example, the transmitting end of the PCIe chip may transmit data to the PCIe chip at the receiving end through one lane, two lanes, four lanes, eight lanes, or 16 lanes simultaneously. A person skilled in the art can learn that, a transmitting end of each lane includes a set of transmitter and receiver, and a receiving end of each lane also includes a set of transmitter and receiver. For example, if the PCIe chip can support signal transmission of only one lane, one set of transmitter and receiver is included in the PCIe chip at the transmitting end and also one set of transmitter and receiver is included in the PCIe chip at the receiving end; and if the PCIe chip can support signal transmission of four lanes, four sets of transmitters and receivers may be included in the PCIe chip at the transmitting end and also four sets of transmitters and receivers need to be included in the PCIe chip at the receiving end. Here, one set of transmitter and receiver includes one transmitter and one receiver.

When a link of a certain lane of the PCIe chip is switched or in a low power consumption mode, the link of the lane is in an EI state. It can be understood that, in optical fiber communication, transmission lanes are mutually independent and do not affect each other. For example, when one lane is in an EI state, data transmission of one or more other lanes is not affected. In the embodiments of the present application, the lane described refers to a communication lane established, by using the first optical module and the second optical module, for data transmission between the PCIe chip at the transmitting end (for example, the PCIe chip 14) and the PCIe chip at the receiving end (for example, a PCIe chip 24). It can be understood that, if the PCIe chip at the transmitting end transmits information through the first lane, the PCIe chip at the receiving end receives the information through the first lane. To state in another way, the communication lane described in the embodiments of the present application may be understood as a path through which data passes during transmission. It should be noted that, the first lane in the embodiments of the present application refers to any lane through which the PCIe chip transmits data.

In step 1005, the first optical module 12 determines that a differential-mode voltage of the first electrical signal 901 is lower than a first threshold. In an actual application, a detection circuit 8221 in the first optical module 12 can detect the differential-mode voltage of the first electrical signal 901 and determine whether the differential-mode voltage of the first electrical signal 901 is lower than the first threshold. Specifically, the detection module 8221 can detect the differential-mode voltage of the first electrical signal 901 by detecting a voltage amplitude of the first electrical signal 901. In the embodiment shown in FIG. 10, processing made by the first optical module 12 and the second optical module 22 when the differential-mode voltage of the first electrical signal 901 is lower than the first threshold is described as an example.

The first threshold is a preset threshold of a differential-mode voltage of an electrical signal transmitted by the PCIe chip when a communication lane is in an EI state. According to a definition in the PCIe standard, if a differential-mode voltage of an electrical signal received by the PCIe chip at the receiving end is below 65 mV, the PCIe chip at the receiving end considers that the communication lane is in an electrical idle state. If the differential-mode voltage of the electrical signal received by the PCIe chip at the receiving end is above 175 mV, the PCIe chip at the receiving end determines that the communication lane has exited the electrical idle state and the PCIe chip at the transmitting end transmits a data signal. In an actual application, when a lane of the first PCIe chip 14 is in an EI state, that is, when the differential-mode voltage of the first PCIe chip 14 at the transmitter of the lane is lower than 65 mV, a differential-mode voltage of a differential electrical signal received by a receiving end of the first optical module 12 may be higher than 65 mV in consideration of noises generated on a communication link of the lane. In the embodiment of the present application, in one case, if the detection circuit 8221 is located in the optical module 12, the first threshold may be set to 175 mV in consideration of the noises generated on the communication link. For example, when the detection module 8221 is located in the optical module 12, and when the detection circuit 8221 detects that the differential-mode voltage of the first electrical signal 901 of the first lane is lower than 175 mV, it is considered that the first lane of the PCIe chip 14 of the communication node at the transmitting end 10 is in an EI state. In another case, the first threshold may also be set to 65 mV if the noises generated on the communication link is not taken into consideration. It should be noted that, setting the first threshold to 175 mV or 65 mV is merely an example; and in an actual application, the first threshold may also be adjusted according to actual needs, and the embodiment of the present application has no limitation on this. It can be understood that, the first threshold in the embodiment of the present application is not higher than 175 mV.

In step 1010, the first optical module 12 generates a first control signal 902, where the first control signal 902 indicates that the first lane is in an EI state. Because the first module 12 has determined in the step 1005 that the differential-mode voltage of the first electrical signal 901 is lower than the first threshold, the first optical module 12 considers that the first lane of the first PCIe chip 14 is in an EI state, and the first optical module 12 generates the first control signal 902, where the first control signal 902 indicates that the first lane is in an EI state. In an actual application, a control circuit 8222 in the detection and control circuit 822 of the first optical module 12 may generate the first control signal 902 according to a detection result of the detection circuit 8221 and transmit the first control signal 902 to an electrical-optical conversion module 84. The first control signal 902 may be a drive signal of the electrical-optical conversion module 84, where the drive signal may include a drive current signal. For example, if the electrical-optical conversion module 84 is a laser or a laser array, the first control signal 902 may be a drive current signal of the laser, where the drive current signal is used to control the laser of the first lane to emit a modulated optical signal at a corresponding rate.

To distinguish the optical signal transmitted by the first optical module 12 when a communication lane is in an EI state from an optical signal transmitted by the first optical module 12 when transmitting data, the first optical module 12 may generate the first control signal 902 according to a code pattern of a preset control signal used to indicate that a communication lane is in an EI state. The embodiment of the present application can distinguish a waveform of the control signal when a communication lane is in an EI state from a waveform of the control signal when data is transmitted. For example, in one implementation manner, a frequency of the control signal when a communication lane is in an EI state may be made different from a frequency of the control signal when data is transmitted. Therefore, a frequency of the optical signal emitted by the optical module when a communication lane is in an EI state is different from a frequency of the optical signal emitted by the optical module when data is transmitted. In another implementation manner, an amplitude of the control signal when a communication lane is in an EI state may be made different from an amplitude of the control signal when data is transmitted. Therefore, an optical power of the optical signal emitted by the optical module when a communication lane is in an EI state is different from an optical power of the optical signal emitted by the optical module when data is transmitted. The embodiment of the present application does not limit the waveform of the control signal when a communication lane is in an EI state, so long as the waveform of the control signal when a communication lane is in an EI state can be distinguished from the waveform of the control signal when data is transmitted. As a result, the optical signal transmitted by the optical module when a communication lane is in an EI state can be distinguished from the optical signal transmitted by the optical module when data is transmitted. For the purpose of clearly describing the embodiment of the present application, a control signal generated when the first PCIe chip 14 transmits data is called a second control signal 907 and an optical signal transmitted by the first optical module 12 according to the second control signal 907 is called a third optical signal 908 in the following.

In step 1015, the first optical module 12 transmits the first optical signal 903 to the second optical module 22 according to the first control signal 902. The detection and control circuit 822 in the first optical module 12 transmits the first control signal 902 to the electrical-optical conversion module 84, where the first control signal 902 is used to drive the electrical-optical conversion module 84 to transmit the first optical signal 903 according to the first control signal 902. In an actual application, the first control signal 902 may be a drive current signal, and strength of an optical signal transmitted by the electrical-optical conversion module 84 may be controlled according to a magnitude of a drive current of the first control signal 902. Also, a frequency of an optical signal transmitted by the electrical-optical conversion module 84 may be controlled according to a frequency of the control signal 902.

In an actual application, the electrical-optical conversion module 84 in the first optical module 12 may transmit the first optical signal 903 through the first lane according to the first control signal 902. For example, if the electrical-optical conversion module 84 is a laser array, the electrical-optical conversion module 84 in the first optical module 12 may control the laser of the first lane to transmit the first optical signal 903 according to the first control signal 902 without affecting transmission of an optical signal in one or more other lanes.

As shown in FIG. 1, because the first optical module 12 and the second optical module 22 are connected using an optical fiber 30, the first optical module 12 may transmit the first optical signal 903 to the second optical module 22 by using the optical fiber 30. It can be understood that, because a waveform of the first control signal 902 may be different from a waveform of the second control signal 907 used when data is transmitted, the first optical signal 903 generated by the electrical-optical conversion module 84 according to the first control signal 902 is different from the third optical signal 908 generated by the electrical-optical conversion module 84 according to the second control signal 907. For example, if amplitudes of the first control signal 902 and the second control signal 907 are different, optical power of the first optical signal 903 is different from optical power of the third optical signal 908.

In step 1020, the second optical module 22 converts the first optical signal 903 into a second electrical signal 904. An optical-electrical conversion module 86 in the second optical module 22 can convert the first optical signal 903 into the second electrical signal 904. The optical-electrical conversion module 86 may be a photodiode, and a specific form of the optical-electrical conversion module 86 is not limited herein so long as an optical signal can be converted into an electrical signal.

In step 1025, the second optical module 22 determines, according to the second electrical signal 904, that the first optical signal 903 is an optical signal indicating that the first lane is in an EI state. In an actual application, the second optical module 22 can determine, according to a waveform of the second electrical signal 904, whether the first optical signal 903 is an optical signal indicating that the first lane is in an EI state. If the waveform of the second electrical signal 904 is the same as the waveform of the preset control signal used to indicate that a communication lane is in an EI state, it is determined that the first optical signal 903 is an optical signal indicating that the first lane is in an EI state. If the waveform of the second electrical signal 904 is different from the waveform of the preset control signal used to indicate that a communication lane is in an EI state, it is determined that the first optical signal 903 is not an optical signal used to indicate that the first lane is in an EI state.

A detection module 87 in the second optical module 22 can detect, by means of a light splitting technology, the waveform of the second electrical signal 904 converted from the first optical signal 903 received by the optical-electrical conversion module 86. Therefore, it can be determined whether the waveform of the second electrical signal 904 is the same as the waveform of the preset control signal used to indicate that a communication lane is in an EI state. For example, a part of the first optical signal 903 may be input into the detection module 87 by means of the light splitting technology. The detection module 87 converts the part of the first optical signal 903 into an electrical signal and detects a waveform of the converted electrical signal to obtain the waveform of the second electrical signal 904.

In step 1030, the second optical module 22 suppresses a differential-mode voltage of a third electrical signal 905 to be output through the first lane to the second PCIe chip 24, and a differential-mode voltage of a suppressed third electrical signal 905 is lower than a second threshold. An electrical signal driver module 88 in the second optical module 22 is generally configured to process the electrical signal output by the optical-electrical conversion module 86, to output an electrical signal meeting a requirement to the second PCIe chip 24. In the embodiment of the present application, when receiving the second electrical signal 904 transmitted by the optical-electrical conversion module 86, the electrical signal driver module 88 can process the second electrical signal 904 according to a detection result of the detection module 87, to output the third electrical signal 905 meeting the requirement to the second PCIe chip 24. If the detection module 87 in the second optical module 86 determines, according to the second electrical signal 904, that the first optical signal 903 is an optical signal used to indicate that a communication lane is in an EI state, it means that what transmitted by the first optical signal 903 is not data. In order to suppress transmitting, by the second optical module 22 when the first lane is in an EI state, amplified link noise to the second PCIe chip 24, to keep communication status of the PCIe chips at both ends of the first lane consistent, the electrical signal driver module 88 in the second optical module 22 may suppress the differential-mode voltage of the output third electrical signal 905. The differential-mode voltage of the suppressed third electrical signal 905 is lower than the second threshold, so that the differential-mode voltage of the electrical signal received by the second PCIe chip 24 is lower than 175 mV, thereby achieving a purpose of notifying the second PCIe chip 24 of keeping the receiving end of the first lane in an EI state. It can be understood that, the second threshold may be set according to an actual situation and is not limited herein; and in consideration of the link noise, the second threshold should not exceed 175 mV in an actual application.

In step 1035, the second optical module 22 outputs the suppressed third electrical signal 905 to the second PCIe chip 24 through the first lane. Because the second optical module 22 has suppressed the differential-mode voltage of the third electrical signal 905 in the step 1030 and the differential-mode voltage of the suppressed third electrical signal 905 is lower than the second threshold, in step 1035, a differential-mode voltage of an electrical signal received by the second PCIe chip 24 is not higher than 175 mV after the second optical module 22 outputs the suppressed third electrical signal 905 to the second PCIe chip 24 through the first lane, and therefore, the second PCIe chip 24 does not mistake the received electrical signal for a data signal. This prevents link noise from affecting link status of the first lane when the first lane of the first PCIe chip 14 is in an EI state.

In the embodiment shown in FIG. 10, the first optical module 12 can transmit the first optical signal 903 to the second optical module 22 through the first lane between the existing optical modules, where when the first lane is in a non-EI state, the first lane can be used to transmit data. In another case, an optical fiber lane may be added between the first optical module 12 and the second optical module 22, and this added optical fiber lane is not used to transmit data; instead, this added optical fiber lane is specially used to: when a certain communication lane is in an EI state, transmit an optical signal generated according to a preset control signal used to indicate that a communication lane is in an EI state, to deliver information that the certain communication lane is in an EI state to the second optical module 22. Then, the second optical module 22 can process a differential-mode voltage of an electrical signal output through the corresponding communication lane to the second PCIe chip 24.

According to the communication method described in the foregoing embodiment, when a first optical module detects that a first lane of a first PCIe chip is in an EI state, an optical signal is transmitted through the first lane to a second optical module according to a preset control signal used to indicate that a communication lane is in an EI state, to notify the second optical module that the first lane is in an EI state. The second optical module suppresses, according to the received optical signal used to indicate that the first lane is in an EI state, a differential-mode voltage of a differential electrical signal to be transmitted to a second PCIe chip. The communication method described in the embodiment of the present application can prevent, when a communication lane is in an EI state, an optical module from amplifying link noise, and in addition, keep status of a link between a PCIe chip at a transmitting end and a PCIe chip at a receiving end consistent.

Figure 12:
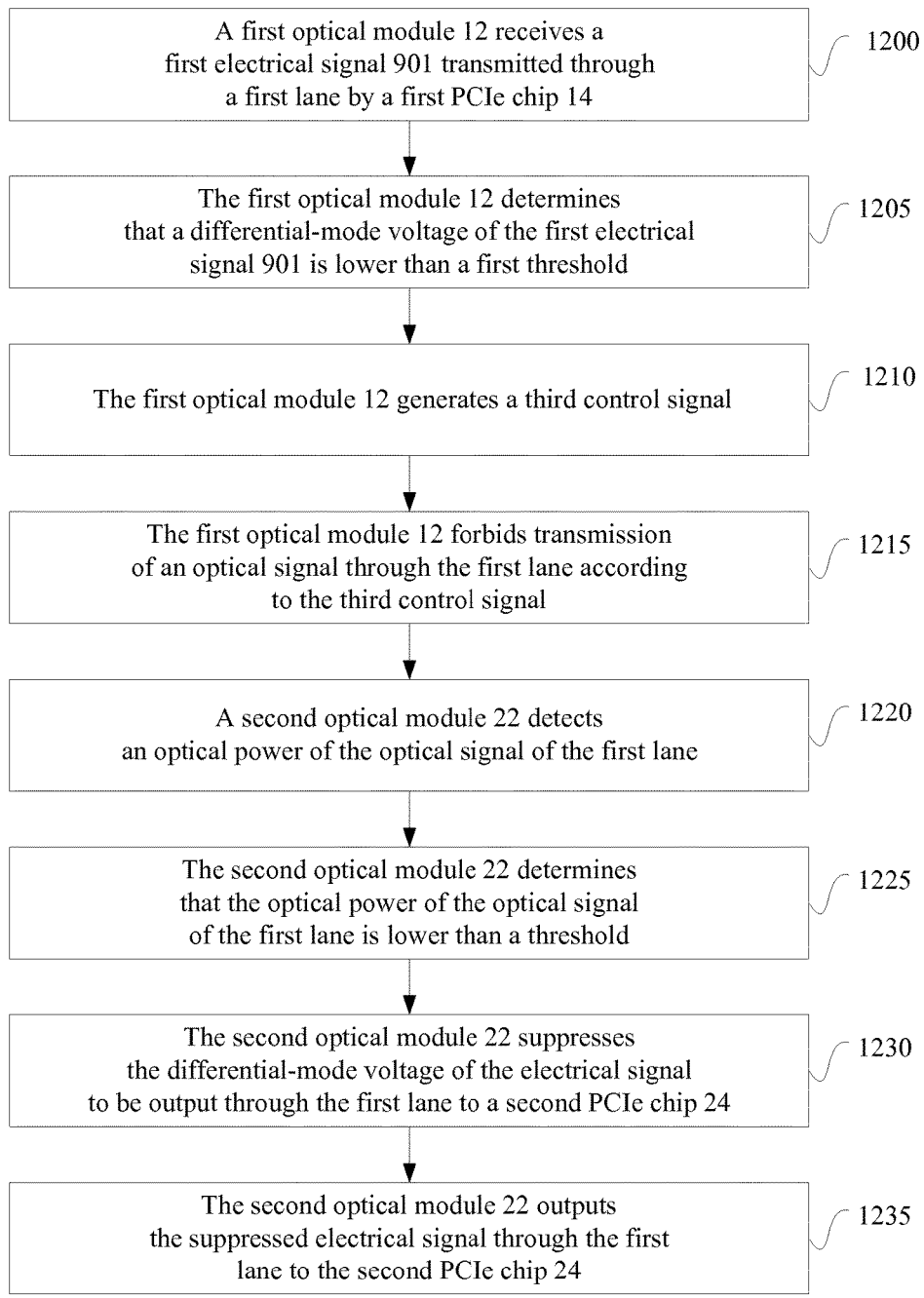
FIG. 12 is a flowchart of a communication method according to yet another embodiment of the present application.

FIG. 12 is a signaling diagram of still another communication method according to an embodiment of the present application, and this method is applied to a communication system in which an optical signal is transmitted according to the PCIe standard. When a communication lane is in an EI state, the method can suppress noises output from the communication lane by an optical module, and in addition, keep status of a link between a PCIe chip at a transmitting end and a PCIe chip at a receiving end consistent. This method may be implemented by the optical module shown in FIG. 1, FIG. 8, or FIG. 9. This method is also described by using an example in which the first PCIe chip 14 is the transmitting end and the second PCIe chip 24 is the receiving end. The following describes FIG. 12 with reference to FIG. 1 and FIG. 8, and as shown in FIG. 12, this method may include:

In step 1200, a first optical module 12 receives a first electrical signal 901 transmitted through a first lane by the first PCIe chip 14. Step 1200 is similar to step 1000 shown in FIG. 10, and for details, reference may be made to description of step 1000 shown in FIG. 10.

In step 1205, the first optical module 12 determines that a differential-mode voltage of the first electrical signal 901 is lower than a first threshold. Step 1205 is similar to step 1005 shown in FIG. 10, and for details, reference may be made to description of step 1005 shown in FIG. 10.

In step 1210, the first optical module 12 generates a third control signal. The third control signal is used to forbid an electrical-optical conversion module 84 in the first optical module 12 to transmit an optical signal through the first lane. The third control signal may be a current signal. A case in which the electrical-optical conversion module 84 is a laser array is used as an example. When a detection circuit 8221 in the first optical module 12 detects that the differential-mode voltage of the first electrical signal 901 of the first lane is lower than the first threshold, the detection circuit 8221 can instruct a control circuit 8222 to cut off a drive current of a laser of the first lane of the electrical-optical conversion module 84, so that the laser of the electrical-optical conversion module 84 is forbidden to transmit an optical signal through the first lane.

In step 1215, the first optical module 12 forbids transmission of an optical signal through the first lane according to the third control signal. In an actual application, a case in which the electrical-optical conversion module 84 is a laser array is used as an example. When the detection circuit 8221 in the first optical module 12 detects that the differential-mode voltage of the first electrical signal 901 of the first lane is lower than the first threshold, the control circuit 8222 cuts off the drive current of the laser of the first lane of the electrical-optical conversion module 84, and therefore, the laser of the first lane of the electrical-optical conversion module 84 does not transmit an optical signal.

In the foregoing communication method, when detecting that the differential-mode voltage of the first electrical signal 901 of the first lane of the first PCIe chip 14 is lower than the first threshold, the first optical module 12 forbids transmission of an optical signal through the first lane. Therefore, when the first lane of the first PCIe chip 14 is in an EI state, output of link noise is controlled from the transmitting end, and the receiving end is prevented from receiving an abnormal signal, and it is ensured that an optical fiber communication link is normal.

In step 1220, a second optical module 22 detects an optical power of the optical signal of the first lane. A detection module 87 in the second optical module 22 can detect the optical power of the optical signal of the first lane by means of a light splitting technology. In an actual application, the detection module 87 can convert a split optical signal into a current signal by using a special photodiode, and calculate the optical power of the optical signal of the first lane according to a magnitude of a current of a converted current signal.

In step 1225, the second optical module 22 determines that the optical power of the optical signal of the first lane is lower than a threshold. In the embodiment of the present application, the threshold refers to a threshold set for the optical power of the optical signal received by the second optical module 22, and if the optical power of the optical signal received by the second optical module 22 is lower than the threshold, the second optical module 22 considers that no effective optical signal is received. It can be understood that, this threshold is less than a value of the optical power of the optical signal when data is transmitted, and a specific value of the threshold of the optical power is not limited in the embodiment of the present application. It can be understood that, referring to FIG. 1, because the first optical module 12 has forbidden transmission of an optical signal through the first lane in step 1215, in step 1225, the optical power of the optical signal of the first lane detected by the second optical module 22 is lower than the threshold and the second optical module 22 does not receive an effective optical signal through the first lane.

In step 1230, the second optical module 22 suppresses the differential-mode voltage of the electrical signal to be output through the first lane to the second PCIe chip 24. A differential-mode voltage of a suppressed electrical signal is lower than a second threshold. In an actual application, in consideration of impact of link noise, a part of electrical signals may also be input to an input end of an electrical signal driver module 88 in the second optical module 22. In step 1230, the electrical signal driver module 88 in the second optical module 22 may suppress, according to a detection result of the detection module 87, a differential-mode voltage of an electrical signal to be output through the first lane to the second PCIe chip 24, and the differential-mode voltage of the suppressed electrical signal is lower than the second threshold, so that the differential-mode voltage of the electrical signal received by the second PCIe chip 24 is lower than 175 mV. For description of the second threshold, reference may be made to related description of the embodiment shown in FIG. 10.

In step 1235, the second optical module 22 outputs the suppressed electrical signal through the first lane to the second PCIe chip 24. In step 1230, the second optical module 22 has suppressed the differential-mode voltage of the electrical signal to be output through the first lane to the second PCIe chip 24, so that the differential-mode voltage of the suppressed electrical signal is lower than the second threshold. Therefore, in step 1235, the differential-mode voltage of the electrical signal received by the second PCIe chip 24 is lower than 175 mV after the second optical module 22 outputs the suppressed electrical signal through the first lane to the second PCIe chip 24. Therefore, the second PCIe chip 24 does not mistake the electrical signal for a data signal, thereby preventing the second PCIe chip 24 from receiving an abnormal signal.

According to the communication method shown in FIG. 12, when the first lane of the first PCIe chip 14 which functions as the transmitting end is in an EI state, the first optical module 12 forbids transmission of an optical signal through the first lane. Furthermore, in a situation in which the first optical module 12 forbids transmission of an optical signal through the first lane, the second optical module 22 suppresses the differential-mode voltage of the electrical signal to be output through the first lane to the second PCIe chip 24. The method shown in FIG. 12 can control output of link noise, prevent the second PCIe chip 24 from receiving an abnormal signal when a communication lane is in an EI state, and ensure that an optical fiber communication link is normal. Further, the second PCIe chip 24 can determine, according to the differential-mode voltage of the electrical signal it receives, that the first lane of the first PCIe chip 14 is still in an EI state, thereby ensuring that link status at both ends of the first lane are consistent.

Figure 13:
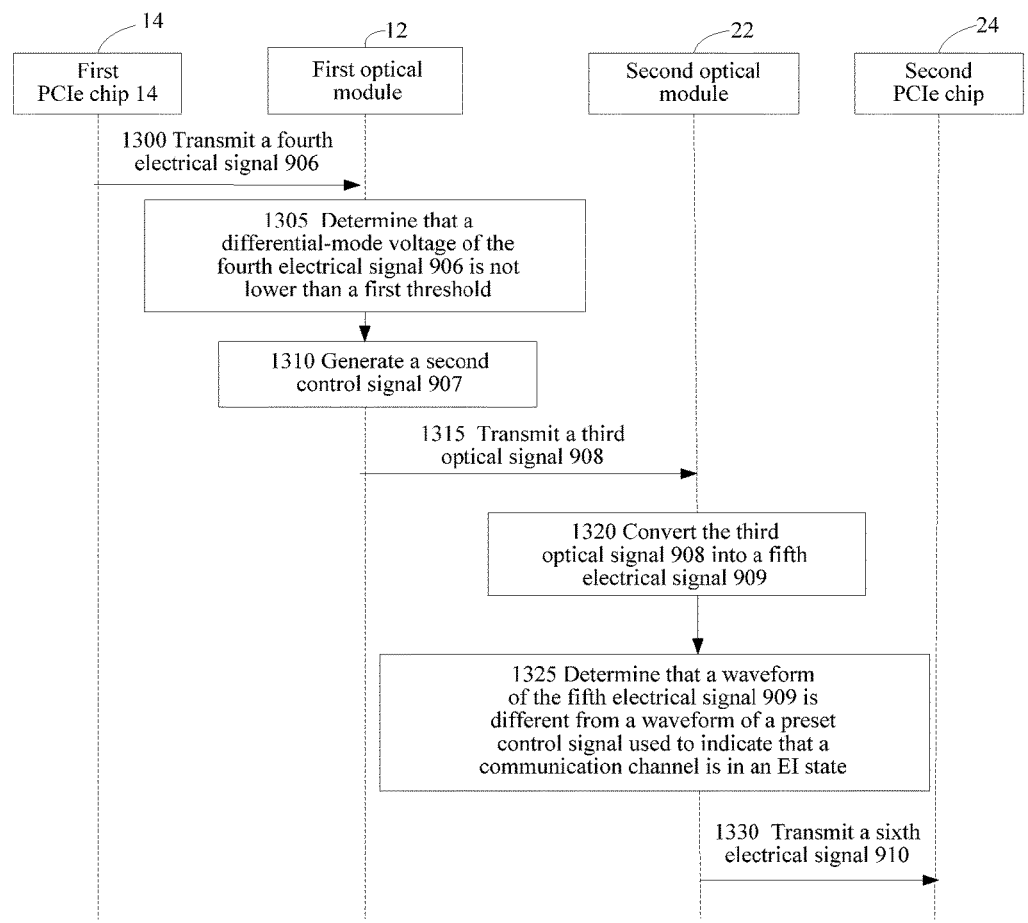
FIG. 13 is a signaling diagram of a communication method according to still another embodiment of the present application.

In yet another case, on the basis of the communication method shown in FIG. 10 or FIG. 12, an embodiment of the present application may further include a communication method shown in FIG. 13. FIG. 13 is a signaling diagram of yet another communication method described in an embodiment of the present application, and this method is applied to a communication system in which an optical signal is transmitted according to the PCIe standard. The signaling diagram of the communication method shown in FIG. 13 depicts a processing process of an optical module when data is transmitted normally between a PCIe chip at a transmitting end and a PCIe chip at a receiving end. This method may be implemented by the optical module shown in FIG. 1, FIG. 8, or FIG. 9. The method shown in FIG. 13 is also described by using a case in which the first PCIe chip 14 is a transmitting end and the second PCIe chip 24 is a receiving end. The following describes FIG. 13 with reference to FIG. 1, FIG. 8, FIG. 11A and FIG. 11B. For details of the signaling described in FIG. 13, reference may be made to signaling shown by dashed lines in FIG. 11A and FIG. 11B. As shown in FIG. 13, the method may include:

In step 1300, a first optical module 12 receives a fourth electrical signal 906 transmitted through a first lane by the first PCIe chip 14. The fourth electrical signal 906 carries data information to be transmitted by the first PCIe chip 14.

In step 1305, the first optical module 12 determines that a differential-mode voltage of the fourth electrical signal 906 is not lower than a first threshold. In an actual application, a detection circuit 8221 in the first optical module 12 can detect the differential-mode voltage of the fourth electrical signal 906 and determine whether the differential-mode voltage of the fourth electrical signal 906 is lower than the first threshold. Specifically, the detection module 8221 can detect the differential-mode voltage of the fourth electrical signal 906 by detecting a voltage amplitude of the fourth electrical signal 906. As described in step 1005 shown in FIG. 10, the first threshold is a threshold of a differential-mode voltage of a preset electrical signal transmitted by the PCIe chip when a communication lane is in an EI state. According to a definition in the PCIe standard, if the differential-mode voltage of the electrical signal received by the PCIe chip at the receiving end is above 175 mV, the PCIe chip at the receiving end determines that the communication lane has exited an electrical idle state and the PCIe chip at the transmitting end transmits a data signal. Therefore, it can be understood that, the first threshold is not higher than 175 mV. Because the fourth electrical signal 906 carries data information transmitted by the first PCIe chip 14, the detection circuit 8221 in the first optical module 12 can detect that the differential-mode voltage of the fourth electrical signal 906 is not lower than the preset first threshold.

In step 1310, the first optical module 12 generates a second control signal 907. In an actual application, when the differential-mode voltage of the fourth electrical signal 906 detected by the detection circuit 8221 in the first optical module 12 is not lower than the first threshold, it means that the first lane of the first PCIe chip 14 has exited the EI state, and normal data is transmitted through the first lane by the first PCIe chip 14. The detection circuit 8221 can transmit the fourth electrical signal 906 to a control circuit 8222, and then the control circuit 8222 generates the second control signal 907 according to the fourth electrical signal 906 and transmits the second control signal 907 to an electrical-optical conversion module 84. The second control signal 907 may be a drive signal of the electrical-optical conversion module 84, where the drive signal may include a drive current signal. It should be noted that, because the second control signal 907 is generated according to the fourth electrical signal 906 carrying data information, a waveform of the second control signal 907 is different from a waveform of a preset control signal used to indicate that a communication lane is in an EI state. It can be understood that, because the fourth electrical signal 906 carries data information transmitted by the first PCIe chip 14, the second control signal 907 generated by the fourth electrical signal 906 also carries the data information transmitted by the first PCIe chip 14.

In step 1315, the first optical module 12 transmits a third optical signal 908 through the first lane to the second optical module 22 according to the second control signal 907. In an actual application, the electrical-optical conversion module 84 in the second optical module 12 can emit, under control of the second control signal 907, a modulated optical signal at a corresponding rate through the first lane. The third optical signal 908 carries the data information transmitted by the first PCIe chip 14. The first optical module 12 can transmit a third optical signal 908 to the second optical module 22 by using an optical fiber 30.

In step 1320, the second optical module 22 converts the third optical signal 908 into a fifth electrical signal 909. Specifically, an optical-electrical conversion module 86 in the second optical module 22 can convert the third optical signal 908 into the fifth electrical signal 909. The optical-electrical conversion module 86 may be a photodiode.

In step 1325, the second optical module 22 determines that a waveform of the fifth electrical signal 909 is different from the waveform of the preset control signal used to indicate that a communication lane is in an EI state. Specifically, a detection module 87 in the second optical module 22 can detect, by means of a light splitting technology, the waveform of the fifth electrical signal 909 converted from the third optical signal 908 received by the optical-electrical conversion module 86, and therefore, it can be determined that the waveform of the fifth electrical signal 909 is different from the waveform of the preset control signal used to indicate that a communication lane is in an EI state.

In step 1330, the second optical module 22 transmits a sixth electrical signal 910 to the second PCIe chip 24 according to the fifth electrical signal 909, where the sixth electrical signal 910 carries the data information transmitted by the first PCIe chip 14. It can be understood that, because the sixth electrical signal 910 carries the data information transmitted by the first PCIe chip 14, an electrical signal driver module 88 in the second optical module 22 does not suppress a differential-mode voltage of the sixth electrical signal 910. The second PCIe chip 24 is capable of identifying from the sixth electrical signal 910 the data transmitted by the first PCIe chip 14. Accordingly, data transmission between the first PCIe chip 14 and the second PCIe chip 24 is completed.

The communication process shown in FIG. 13 describes a normal process of the data transmission between the first PCIe chip 14 and the second PCIe chip 24, where the normal process is similar to the transmission process of transmitting data in a prior art in a communication system in which an optical signal is transmitted according to the PCIe standard, and therefore, it is not described in detail herein.

In another implementation manner, if a communication lane is in an EI state, the processing method described in FIG. 12 is adopted by the first optical module. Correspondingly, when the communication lane transmits data, in step 1325, the second optical module 22 can determine, by detecting an optical power of the third optical signal 908, that the third optical signal 908 is an optical signal for transmitting data. Because the third optical signal 908 carries data, and the optical power of the third optical signal is not lower than the preset second threshold, it can be determined according to the optical power of the third optical signal 908 that a data signal is transmitted. For such an implementation manner in other steps, reference may be made to related steps shown in FIG. 13, which are not specially described herein.

In still another implementation manner, when the first optical module 12 functions as an optical module at the receiving end, the first optical module 12 can also process an optical signal, which is transmitted by the second optical module 22 as an optical module at the transmitting end when a communication lane is in an EI state. In the following, a case in which the first optical module 12 functioning as the optical module at the receiving end receives, through the second lane, and process a special optical signal transmitted by the second optical module 22 is used as an example for brief description. When the second lane is in an EI state, the optical-electrical conversion module 86 in the first optical module 12 can receive the second optical signal transmitted through the second lane by the second optical module 22 and convert the received second optical signal into an electrical signal. The detection module 87 in the first optical module 12 can determine whether the second optical signal is an optical signal indicating that a communication lane is in an EI state. For example, it can determine whether the second optical signal is an optical signal indicating that a communication lane is in an EI state, by determining whether a waveform of the electrical signal converted from the second optical signal is the same as the waveform of the preset control signal used to indicate that a communication lane is in an EI state. If the detection module 87 in the first optical module 12 determines that the second optical signal is an optical signal indicating that a communication lane is in an EI state, the electrical signal driver module 88 in the first optical module 12 can suppress the differential-mode voltage of the electrical signal to be transmitted through the second lane to the receiving end of the first PCIe chip 14, where the differential-mode voltage of the suppressed electrical signal is lower than the second threshold, and transmit the suppressed electrical signal to the first PCIe chip 14, so that the differential-mode voltage of the electrical signal received by the first PCIe chip 14 is lower than 175 mV. Therefore, when the second lane of the transmitting end is in an EI state, an abnormal signal received by the first PCIe chip 14 through the second lane can be suppressed, so that the first PCIe chip 14 determines that the second lane is still in an EI state, thereby keeping link status at both ends of the second lane consistent.

It can be understood that, for the optical-electrical conversion module 86, the detection module 87, and the electrical signal driver module 88 in the first optical module 12 when the first optical module 12 functions as the optical module at the receiving end, reference may be made to descriptions of the optical-electrical conversion module 86, the detection module 87, and the electrical signal driver module 88 in the second optical module 22 when the second optical module 22 functions as the optical module at the receiving end, which are not described herein again.

As can be clearly acknowledged by a person skilled in the art, the technology described in the embodiments of the present application may be implemented by means of software plus an essential general hardware platform. Based on such an understanding, the technical solutions of the present application may be implemented in a form of a software product. The software product may be program codes stored in a storage medium, such as a ROM/RAM, a magnetic disk, or an optical disc, and include several instructions for instructing a computer device (which may be a personal computer, a server, or a network device) to perform the methods described in the embodiments or some parts of the embodiments of the present application.

Embodiments in this specification are described in a progressive manner, and for identical or similar parts between different embodiments, reference may be made to each other, with each of the embodiments focusing on differences from other embodiments. Especially, the system embodiments are described relatively simply because it is basically similar to the method embodiments, and for a related part, reference may be made to a part of description of the method embodiments.

What is claimed is:

1. A communication device, comprising:
   a central processing unit (CPU);
   a peripheral component interconnect express (PCIe) chip having a transmitting end and a receiving end; and
   a detection and control circuit,
   wherein:
   the PCIe chip is configured to transmit an electrical signal on a first lane of the transmitting end to a first lane of an electrical-optical signal converter;
   the detection and control circuit is configured to detect a differential-mode voltage of the electrical signal, and if the differential-mode voltage of the electrical signal is lower than a first threshold, transmit a detection result that the differential-mode voltage is lower than the first threshold to the CPU in an interrupt mode; and
   the CPU is configured to disable a laser of the first lane of the electrical-optical signal converter from transmitting the optical signal.

2. The communication device according to claim 1, wherein in disabling the laser of the first lane of the electrical-optical signal converter from transmitting the optical signal, the CPU is configured to:
   disable, by using a TX-DISABLE function, the laser of the first lane of the electrical-optical signal converter, so that no optical signal is transmitted on the first lane.

3. The communication device according to claim 1, wherein in disabling the laser of the first lane of the electrical-optical signal converter from transmitting the optical signal, the CPU is configured to:
   transmit a disable command to an out-of-band management interface of the electrical-optical signal converter, to disable the laser of the first lane of the electrical-optical signal converter from transmitting the optical signal.

* * * * *